United States Patent
Aibester et al.

(10) Patent No.: US 11,637,739 B2
(45) Date of Patent: Apr. 25, 2023

(54) DIRECT MEMORY ACCESS (DMA) ENGINE FOR DIAGNOSTIC DATA

(71) Applicant: MELLANOX TECHNOLOGIES TLV LTD., Raanana (IL)

(72) Inventors: Niv Aibester, Herzliya (IL); Aviv Kfir, Nili (IL); Gil Levy, Hod Hasharon (IL); Liron Mula, Ramat Gan (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/145,341

(22) Filed: Jan. 10, 2021

(65) Prior Publication Data

US 2022/0224585 A1     Jul. 14, 2022

(51) Int. Cl.
*H04L 41/06*     (2022.01)

(52) U.S. Cl.
CPC .................................. *H04L 41/06* (2013.01)

(58) Field of Classification Search
CPC ....................................................... H04L 41/06
USPC ....................................................... 370/252
See application file for complete search history.

(56) References Cited

U.S. PATENT DOCUMENTS

| | | | |
|---|---|---|---|
| 6,717,910 B1 * | 4/2004 | Kasper | H04L 49/9078 710/48 |
| 6,751,663 B1 * | 6/2004 | Farrell | H04L 63/08 709/224 |
| 8,606,911 B2 | 12/2013 | Raleigh et al. | |
| 8,879,393 B2 | 11/2014 | Voruganti et al. | |
| 9,755,932 B1 | 9/2017 | Godbole et al. | |
| 10,181,987 B2 | 1/2019 | Gandham et al. | |
| 10,530,673 B2 * | 1/2020 | Dor | H04L 43/065 |
| 10,798,254 B2 | 10/2020 | Raleigh et al. | |
| 10,924,374 B2 | 2/2021 | Kfir et al. | |
| 2002/0184568 A1 | 12/2002 | Kurrasch | |
| 2010/0020722 A1 | 1/2010 | Farkas et al. | |
| 2011/0261720 A1 | 10/2011 | Diab et al. | |
| 2012/0243412 A1 | 9/2012 | Voruganti et al. | |
| 2013/0275566 A1 | 10/2013 | Huth et al. | |
| 2014/0133358 A1 | 5/2014 | Yin et al. | |

(Continued)

OTHER PUBLICATIONS

MELLANOX/MLXSW—"Link Layer Discovery Protocol", pp. 1-2, Jul. 7, 2016 downloaded from https://github.com/Mellanox/mlxsw/wiki/Link-Layer-Discovery-Protocol.

(Continued)

*Primary Examiner* — James E Springer
*Assistant Examiner* — Patrick F Ngankam
(74) *Attorney, Agent, or Firm* — Kligler & Associates Patent Attorneys Ltd

(57) ABSTRACT

A network-connected device includes at least one communication port, packet processing circuitry and Diagnostics Direct Memory Access (DMA) Circuitry (DDC). The at least one communication port is configured to communicate packets over a network. The packet processing circuitry is configured to receive, buffer, process and transmit the packets. The DDC is configured to receive a definition of (i) one or more diagnostic events, and (ii) for each diagnostic event, a corresponding list of diagnostic data that is generated in the packet processing circuitry and that pertains to the diagnostic event, and, responsively to occurrence of a diagnostic event, to gather the corresponding list of diagnostic data from the packet processing circuitry.

31 Claims, 6 Drawing Sheets

(56) References Cited

U.S. PATENT DOCUMENTS

| | | | |
|---|---|---|---|
| 2014/0321460 A1 | 10/2014 | Kaneko et al. | |
| 2015/0156072 A1 | 6/2015 | Kirrmann | |
| 2016/0127197 A1 | 5/2016 | Yethadka et al. | |
| 2016/0359704 A1* | 12/2016 | Gandham | H04L 41/0668 |
| 2019/0132736 A1 | 5/2019 | Raleigh et al. | |
| 2019/0158429 A1* | 5/2019 | Friedman | H04L 41/06 |
| 2020/0036603 A1* | 1/2020 | Nieves | H04L 47/823 |
| 2020/0059426 A1 | 2/2020 | Raleigh et al. | |
| 2020/0065524 A1 | 2/2020 | Carlson | |
| 2021/0021503 A1* | 1/2021 | Kfir | H04L 43/062 |
| 2021/0306166 A1* | 9/2021 | Piasetzky | H04L 12/06 |

OTHER PUBLICATIONS

IEEE Std 802.1AB™, "IEEE Standard for Local and Metropolitan Area Networks—Station and Media Access Control Connectivity Discovery", pp. 1-172, May 6, 2005.

Tammana et al., "Distributed Network Monitoring and Debugging with SwitchPointer," Proceedings of the 15th USENIX Symposium on Networked Systems Design and Implementation (NSDI '18), pp. 452-466, Renton, USA, Apr. 9-11, 2018.

Levy et al., U.S. Appl. No. 16/792,247, filed Feb. 16, 2020.

\* cited by examiner

DIRECT MEMORY ACCESS (DMA) ENGINE FOR DIAGNOSTIC DATA

FIELD OF THE INVENTION

The present invention relates generally to computer networks, and specifically to remote diagnostics of network connected devices.

BACKGROUND

Monitoring and diagnosing of networks and, in particular, of network connected devices (e.g., network interface cards, host interface adapters, switches and routers) present a major challenge because of the large amount of data that is transmitted at high rates and the complexity of the forwarding schemes. In "Distributed Network Monitoring and Debugging with SwitchPointer," Proceedings of the 15th USENIX Symposium on Networked Systems Design and Implementation (NSDI '18), Apr. 9-11, 2018, the authors describe a network monitoring and debugging system that exploits end-host resources and programmability to collect and monitor telemetry data, which provides network visibility by using switch memory as a "directory service" for monitoring functionalities.

SUMMARY

An embodiment of the present invention that is described herein provides a network-connected device including at least one communication port, packet processing circuitry and Diagnostics Direct Memory Access (DMA) Circuitry (DDC). The at least one communication port is configured to communicate packets over a network. The packet processing circuitry is configured to receive, buffer, process and transmit the packets. The DDC is configured to receive a definition of (i) one or more diagnostic events, and (ii) for each diagnostic event, a corresponding list of diagnostic data that is generated in the packet processing circuitry and that pertains to the diagnostic event, and, responsively to occurrence of a diagnostic event, to gather the corresponding list of diagnostic data from the packet processing circuitry.

In some embodiments the DDC is configured, responsively to occurrence of multiple diagnostic events, to gather multiple respective lists of diagnostic data from the packet processing circuitry over respective time periods that at least partially overlap one another.

In some embodiments, the DDC includes multiple DDC instances that are configured to gather the diagnostic data for constructing the lists. In an embodiment, at least two of the DDC instances are configured to gather the diagnostic data from respective different parts of the packet processing circuitry. Additionally or alternatively, at least two of the DDC instances may be configured to gather the diagnostic data pertaining to a same diagnostic event.

In a disclosed embodiment, the packet processing circuitry includes a packet processing pipeline having multiple pipeline stages, and the DDC is configured to gather the diagnostic data from two or more of the pipeline stages. In an example embodiment, the DDC is configured to gather the diagnostic data by reading one or more counter values in the packet processing circuitry.

In another embodiment, the DDC is configured to receive a diagnostics trigger and to gather the corresponding list of diagnostic data from the packet processing circuitry responsively to the diagnostics trigger.

In some embodiments, the DDC is configured to send the gathered list to a specified destination. In an embodiment, the network-connected device further includes a memory, and the specified destination comprises storage locations in the memory. In another embodiment, the specified destination includes a processor of the network-connected device, or a host that hosts the network-connected device. In yet another embodiment, the specified destination includes an address of another network-connected device that is coupled to the network. In a disclosed embodiment, the packet processing circuitry includes an egress queue for queuing egress packets, and the DDC is configured to send the list of diagnostic data to the egress queue.

There is additionally provided, in accordance with an embodiment of the present invention, a method including, in a network-connected device, receiving, buffering, processing and transmitting packets over a network using packet processing circuitry. Using Diagnostics Direct Memory Access (DMA) Circuitry (DDC) in the network-connected device, a definition is received of (i) one or more diagnostic events, and (ii) for each diagnostic event, a corresponding list of diagnostic data that is generated in the packet processing circuitry and that pertains to the diagnostic event. Responsively to occurrence of a diagnostic event, the corresponding list of diagnostic data is gathered from the packet processing circuitry using the DDC.

There is additionally provided, in accordance with an embodiment of the present invention, a method including, in a network device, receiving, processing and transmitting packets over a network using packet-processing circuitry. Diagnostic circuitry is operated in the network device, so as to receive a definition of (i) diagnostic events that are expected to occur in the network device, and (ii) for each diagnostic event, a corresponding list of diagnostic data that is to be collected for analysis from the packet-processing circuitry, and upon occurrence of a diagnostic event, gather the list of diagnostic data which corresponds to the diagnostic event according to the definition.

The present invention will be more fully understood from the following detailed description of the embodiments thereof, taken together with the drawings in which:

DETAILED DESCRIPTION OF EMBODIMENTS

Overview

Figure 1:
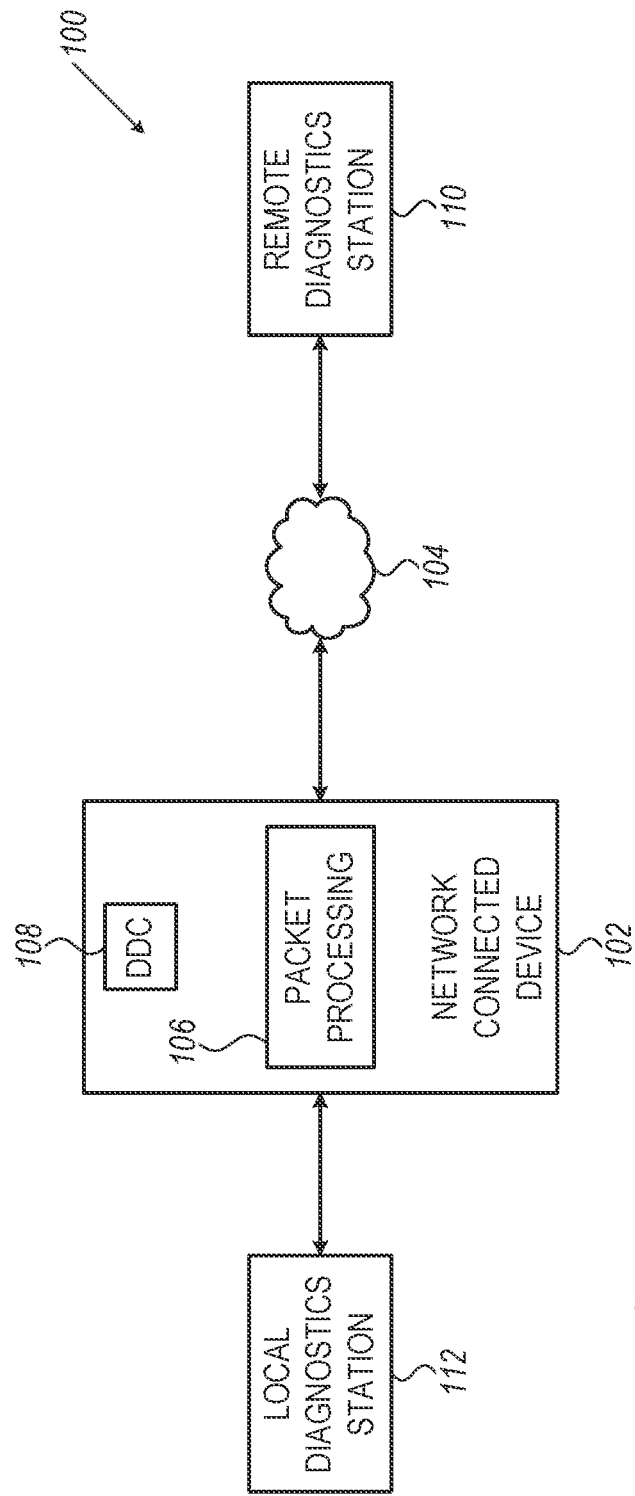
FIG. 1 is a block diagram that schematically illustrates a computer network, in accordance with an embodiment of the present invention.

Legacy computer networks may be monitored for slow or failing components, for faulty links, and for erroneous or sub-optimal forwarding decisions. The Monitoring and debug of large-scale networks is a challenging problem, for example since the network performance is affected by real-time decisions taken by the numerous network elements, including routing paths, packet drops, sizes of buffers, various congestion mitigation parameters and others.

Network-connected devices (NCDs) such as routers, switches, network-interface controllers (NICs) and host-channel adapters (HCAs), e.g., in network fabrics such as Fat-tree, Dragonfly and others, may comprise circuitry that aggregates and accumulates information relating to the device's forwarding decisions; such information may be useful for network debug, network performance tuning (and other applications; e.g., Machine-Learning of network behavior). The information typically comprises cache hit rates, packet drop rates, buffers occupancy, routing decisions, security events and many others. To diagnose failures or performance drops of an NCD, it may be desirable to output parts of the accumulated data for analysis. This task, however, may be complicated for high performance NCDs with a rich feature-set, where the accumulated data spans various circuits of the NCD.

Embodiments of the present invention that are described herein provide methods and system for the efficient collection and output of debug related information. In embodiments, the NCD comprises one or more Diagnostics Direct Memory Access Circuits (DDC). The DDC is configured to receive from a processor (local or remote) a definition of diagnostics events and the corresponding diagnostics data that should be monitored if the diagnostics event occurs. In an embodiment, the DDC then programs various diagnostics event sources within the NCD (e.g., ingress-port processing circuits, egress port processing circuits, shared buffers, forwarding tables and queueing systems) to detect and signal the occurrence of the diagnostics events. In some embodiments, diagnostics events may be also software triggered (e.g., a user may issue a command that the DDC interprets as a detection of a diagnostics event).

When the DDC receives an indication that a diagnostics event has been detected by any of the diagnostics event sources, the DDC may DMA-transfer the corresponding diagnostics data to a diagnostics data buffer. In some embodiments, the NCD is configured to send the contents of the diagnostics data buffer over the network, for analysis by a remote diagnostics station; in other embodiments the diagnostics data is analyzed locally. It should be noted that the diagnostics data required to analyze a diagnostics event is not confined to the diagnostics event source; rather, diagnostics data from various sub-units of the NCD may be required.

More details will be disclosed in the System Description hereinbelow, with reference to example embodiments.

System Description

FIG. 1 is a block diagram that schematically illustrates a Computer Network 100, in accordance with an embodiment of the present invention. Computer network 100 comprises a Network-Connected Device (NCD) 102 that communicates over a communication network 104 with peer network connected devices. NCD 102 may comprise, for example, a switch, a router, a network adapter such as a network-interface controller (NIC) or host-channel adapter (HCAs), a network-enabled graphics processing unit (GPU), or any other suitable type of network device.

NCD 102 comprises a Packet Processing circuitry 106, which is configured to receive, buffer, process and transmit packets, and may comprise a plurality of buffers, queues, routing tables, congestion mitigation circuits, forwarding circuits and other circuits. In an embodiment, computer network 100 further comprises a remote diagnostics station 110 that is coupled to communication network 104, and may be used to remotely diagnose NCD 102. Additionally or alternatively, a Local Diagnostics Station 112 may be coupled to NCD 102, for example, through a serial link, and the DDC may be configured to send the monitored data over the serial link.

To facilitate on-line monitoring and diagnostics, NCD 102 comprises a Diagnostics Direct-Memory-Access Circuit (DDC) 108, which is configured to detect diagnostics events, and, responsively to the detection, send diagnostics data to a diagnostics station. The DDC receives definitions of diagnostics events—for example, a predefined forwarding decision, a packet drop, a buffer overflow, or less severe events like cache-misses. For each defined diagnostics event, the DDC further receives a definition of the corresponding data to be monitored; for example, for a packet-drop event, the corresponding monitored data may comprise buffer occupancies and accumulated cache hit rate. When a pre-defined diagnostics event occurs, the DDC accumulates the corresponding monitored data, and then sends the monitored data to a predefined destination that the DDC receives (e.g., to Remote Diagnostics Station 110).

Thus, according to the example embodiment illustrated in FIG. 1, the DDC receives indication of detected diagnostics events, collects monitoring data that corresponds to the events, and send the monitored data to a predefined diagnostics station, which may be local or remote.

Figure 2:
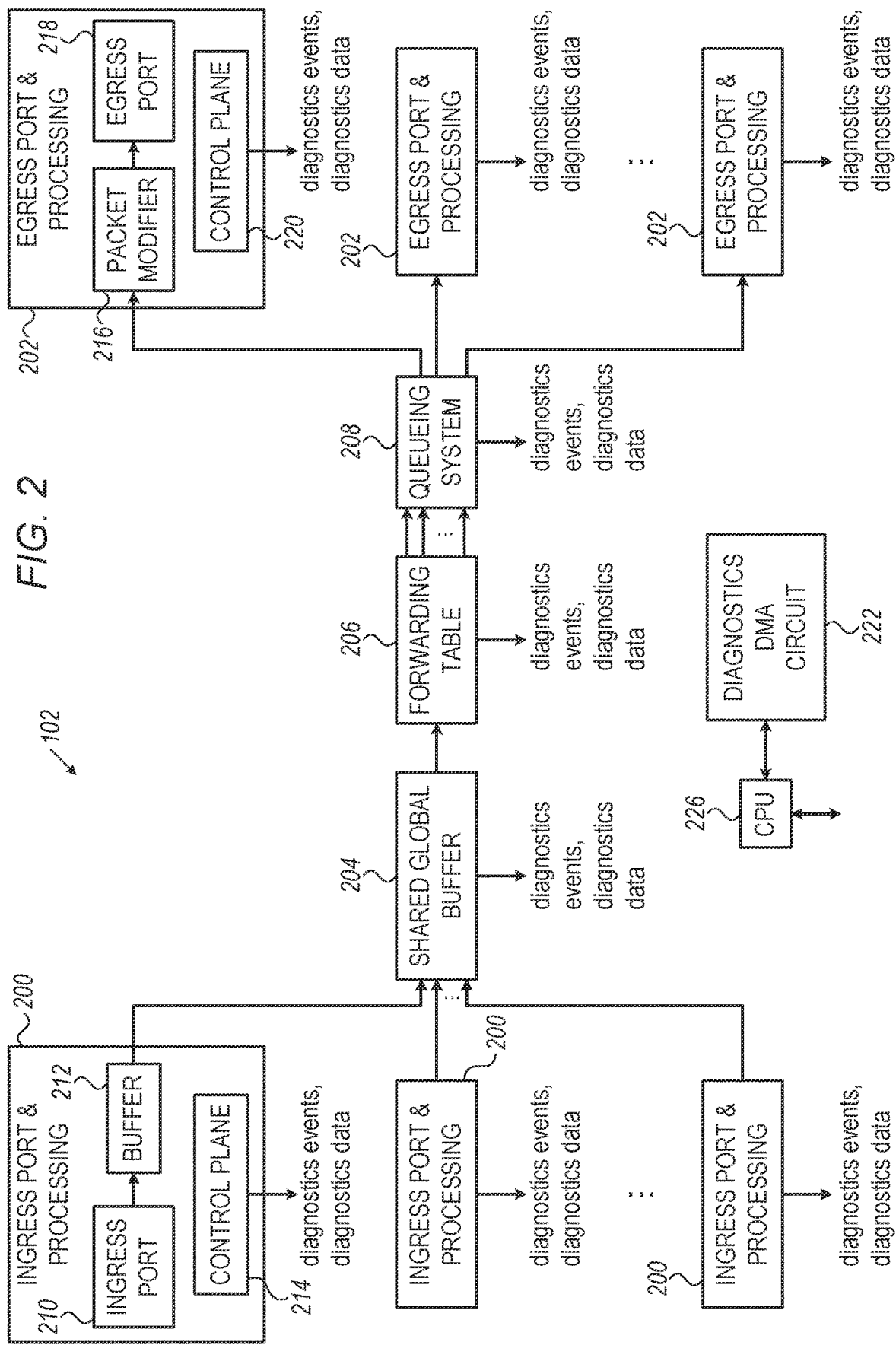
FIG. 2 is a block diagram that schematically illustrates a Network-Connected Device (NCD), in accordance with an embodiment of the present invention.

FIG. 2 is a block diagram that schematically illustrates Network-Connected Device (NCD) 102, in accordance with an embodiment of the present invention. NCD 102 comprises Ingress-Port-and-Processing units 200, which are configured to receive and process ingress packets; a Shared-Global-Buffer 202, which is configured to temporarily store ingress packets; a Forwarding-Table 204, which is configured to define destinations for the ingress packets; a Queueing system 208, which is configured to queue egress packets; and, Egress-Port-and-Processing units 202, which are configured to modify and output egress packets.

Each Ingress-Port-and-Processing circuit 200 comprises an ingress port 210, which is configured to receive packets from network 104 (FIG. 1), a Buffer 212, which is configured to buffer ingress packets, and a Control-Plane 214, which is configured to control the operation of the ingress-port-and-processing. Each Egress-Port-and-Processing circuit 202 comprises a Packet-Modifier 216, which is configured to modify the egress packets (typically add headers), an Egress port 218, which is configured to send packets over network 104, and a control plane 220, which is configured to control the operation of the egress-port-and-processing circuit.

When NCD 102 communicates packets over Network 104, various events may occur, such as packet drops, security blocking of packets, the sending of congestion notification packets and others; and it may be desirable to detect and/or monitor the occurrence of some or all such events. The events may originate in any of circuits 200, 202, 204, 206 or 208 (which will be referred to hereinbelow as "diagnostics event sources"). When a diagnostics event occurs, it may be desirable to monitor some diagnostics data. For example, when a packet is dropped, it may be desirable to inspect the status of the corresponding transmit queues (in embodiments, the status of the transmit queues is constantly monitored and stored in local memory; and, upon detection of a packet drop, the stored monitoring data should be sent out for inspection).

To facilitate diagnostics, NCD 102 further comprises a Diagnostics-DMA-Circuit (DDC) 222, and a CPU 226. The DDC is configured to receive definitions of diagnostics events and corresponding diagnostics data from CPU 226 (in some embodiments, the DDC may receive the diagnostics events definition form a remote processor). The DDC then programs corresponding diagnostics event sources to detect the diagnostics events and signal the detection to the DDC. When the DDC receives a diagnostics event detection signal from any of the diagnostics event sources, the DDC gathers the corresponding diagnostics data, and DMA-transfers the data to a buffer (not shown; will be discussed below, with reference to FIG. 5).

In some embodiments, NCD 102 comprises a plurality of DDC circuits, and, if a plurality of diagnostics events are detected at the same time or in close temporal proximity to each other, the diagnostics events may be assigned to different DDC circuits, which will DMA-transfer the corresponding diagnostics data concurrently. In embodiments, diagnostics data from multiple sources may be gathered at time intervals which partly or fully overlap. In some embodiments, two or more DDC instances may be configured to detect the same diagnostics event (and, typically, collect different data). In some embodiments, the packet processing circuitry comprises a pipeline, and the DDC is configured to gather the diagnostic data from multiple pipeline stages.

The NCD can then send the diagnostics data collected by the DDC to a remote diagnostics station, which may be coupled to the network or coupled the NCD 102. In an embodiment, the NCD sends the diagnostics data only when the gathering of data in the buffer is complete; in a second embodiment the NCD sends the diagnostics data while data gathering is still in progress; in a third embodiment, the NCD may be configured to either send data when gathering is completed, or send the data while gathering is in progress; and, in a fourth embodiment, the NCD be configured to send diagnostics data from a first set of diagnostics data sources when the data gathering is complete, and from a second set of diagnostics data sources while gathering is still in progress.

As would be appreciated, the structure of NCD 102 illustrated in FIG. 2 and described hereinabove is an example embodiment cited by way of example. Other circuits may be used in alternative embodiments. For example, in some embodiments the NCD comprises circuitry that initiates (rather than relays) communication packets (e.g., generated by CPU 226). In some embodiments, Ingress/Egress bidirectional ports are used. CPU 226 may comprise one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 3:
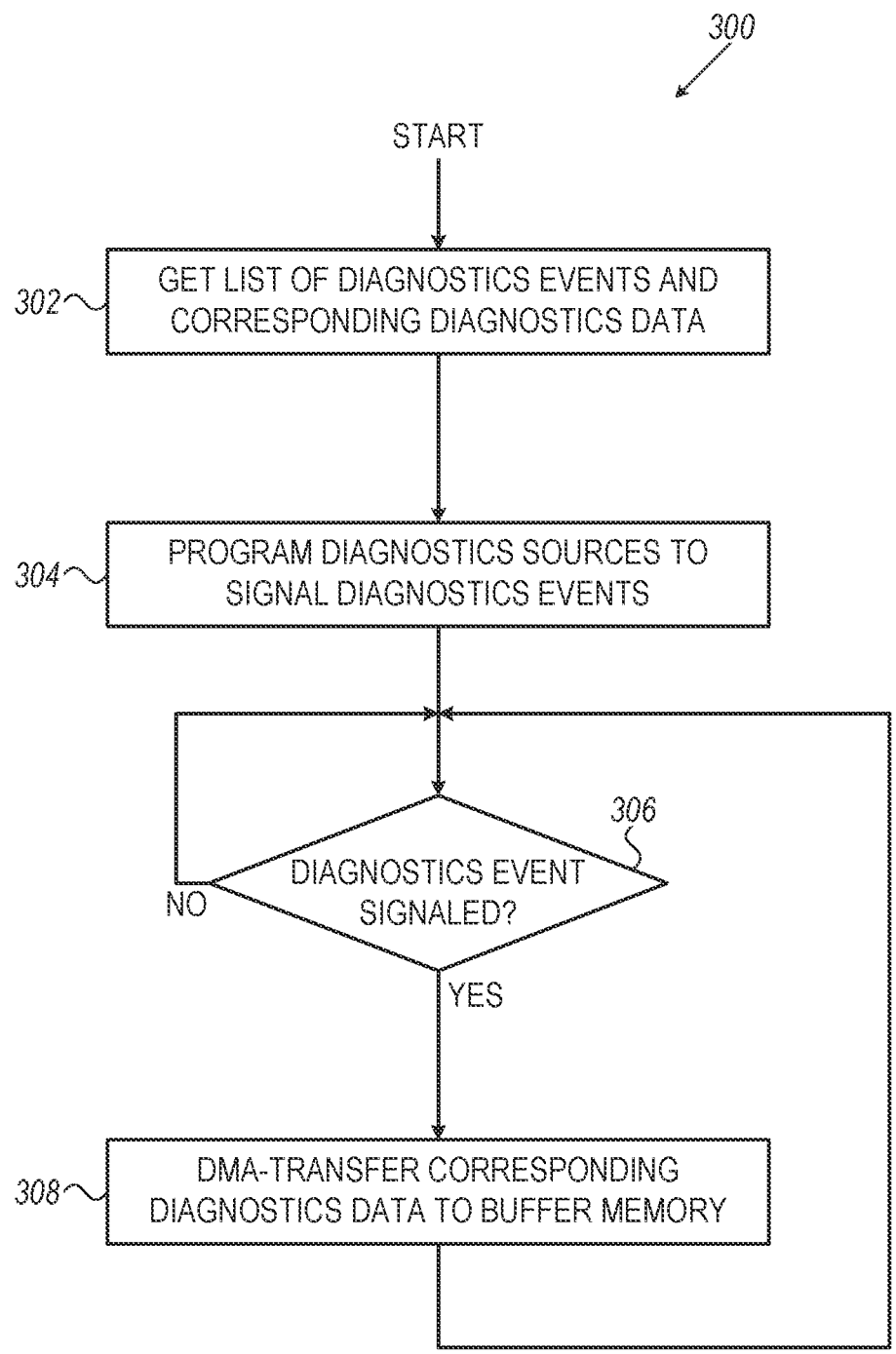
FIG. 3 is a flowchart that schematically illustrates a method for the efficient collection of diagnostics data from an NCD, in accordance with an embodiment of the present invention.

FIG. 3 is a flowchart 300 that schematically illustrates a method for the efficient collection of diagnostics data from an NCD, in accordance with an embodiment of the present invention. The flowchart is executed by DDC 222 (FIG. 2).

The flowchart starts at a Get-List step 302, wherein the DDC gets a list of diagnostics events and corresponding diagnostics data (referred to hereinbelow as "DEDD-list"). The DEDD-list may be provided by CPU 116 (FIG. 2), which generates the list, typically in response to debug requests that the CPU receives, e.g., from diagnostics station 110 or 112.

Next, the DDC enters a Program-Diagnostics-Sources step 304, and programs one or more diagnostics sources to indicate detection of a corresponding diagnostics event (for example, a transmit queue may be programmed to signal a queue-overflow event), and then enters a Check-Diagnostics-Event step 306, wherein the DDC loops until a diagnostics event is detected and signaled by one (or more) of the diagnostics event sources.

When a diagnostics event is signaled by one or more diagnostics sources, the DDC enters a DMA-Transfer step 308, consults the DEDD-List (defined in step 302) and DMA-transfers diagnostics data corresponding to the diagnostics event to a diagnostics data buffer. The DDC then reenters step 306, to wait for the next diagnostics event.

As would be appreciated, flowchart 300 illustrated in FIG. 3 and described hereinabove is a conceptual flowchart cited by way of example, merely for the sake of conceptual clarity. Alternative flowcharts may be used in alternative embodiments of the present invention. For example, in an embodiment, the DDC may receive updates to the DEDD-list while waiting for a diagnostics event (e.g., looping over step 306), or while the DDC is in any other step. The DDC may flush the DEDD-list or parts thereof responsively to an instruction, e.g., from CPU 226. (The mechanism to output the diagnostics data from the NCD will be described with reference to the example embodiment illustrated in FIG. 6 below.)

List of Diagnostics Events

The following is a non-limiting list of examples of diagnostics events and diagnostics data. In some embodiments, some of the diagnostics events hereinbelow may not be used; in other embodiments, additional diagnostics events may be used.

Ingress-Ports-and-Processing Events:
1. Buffering events (e.g., queue-full, queue-empty).
2. Mirror events (e.g., a mirror packet is generated).
3. Forwarding events (e.g., forwarding decisions).
4. Policers events (e.g., a drop event when a maximum rate is exceeded, dropping of packets of a predefined type, or when a minimum or a maximum rate of a predefined queue has been reached).
5. Shaper events (e.g., maximum or minimum bandwidth that has been set for a queue is not met).
6. WRED events (e.g., random drop-packet events).

Global-Shared-Buffer Events:
1. Queues occupancy (e.g., the occupancy exceeds a preset threshold).
2. Buffer histogram
3. Tail-drop counters (e.g., number of packets dropped by a tail-drop algorithm)
4. Congestion counters (e.g., counters that count congestions events)
5. Pool occupancies (e.g., the occupancies of a pool of buffers)

Figure 4:
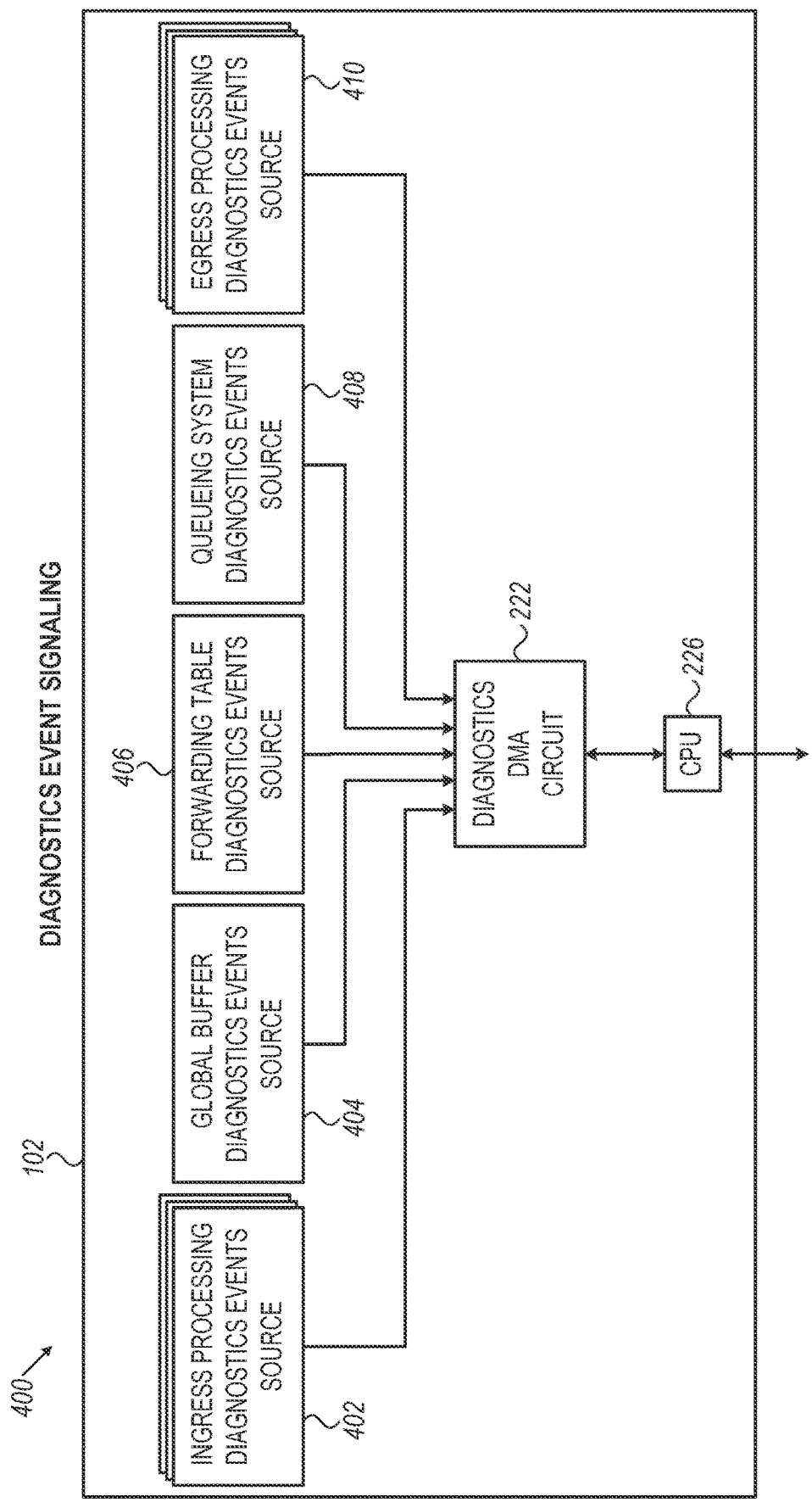
FIG. 4 is a block diagram that schematically illustrates diagnostics events signaling circuitry in an NCD, in accordance with an embodiment of the present invention.

Forwarding Table Events:
1. Caching counters (e.g. counters for cache hit/miss)
2. Forwarding actions
3. ACL (action list) counters
4. Flow counters (e.g., counting of packets with a predefined header field value).
Queueing System Events
1. AQM (Active Queue Management) events
2. ETF (Enhanced Transmission Selection)
3. Shaper Events (e.g., setting the maximum bandwidth according to the class-of-service)
Egress-Ports-and-Processing Events
1. Port histograms
2. Latency Histograms
3. Various port counters FIG. 4 is a block diagram 400 that schematically illustrates diagnostics events signaling circuitry in an NCD 102, in accordance with an embodiment of the present invention. Each of Ingress-Ports-and-Processing circuits 200 (FIG. 2) comprises An Ingress-Processing-Diagnostics-Events-Source circuit 402, which is configured to detect and signal preprogrammed diagnostics events (e.g., events that were programmed in Program Diagnostic Events step 304, FIG. 3).

In a similar manner, Shared-Global-Buffer 204 (FIG. 2) comprises a Shared-Global-Buffer-Diagnostics-Events-Source circuit 404, Forwarding-Table 206 comprises a Forwarding-Table-Diagnostics-Events-Source 406, Queueing-System 208 comprises a Queueing-System-Diagnostics-Events-Source 408 and each Egress-Ports-and-Processing circuit 202 comprises an Egress-Processing Diagnostics-Events-Source 410.

DDC 222 receives the diagnostics signaling from all sources in the NCD, and, responsively, may start a DMA transfer of the corresponding diagnostics data (step 308 of flowchart 300, FIG. 3).

As would be appreciated, diagnostics events signaling 400 illustrated in FIG. 4 and described hereinabove is an example embodiment cited by way of example. Other diagnostics events signaling schemes may be used in alternative embodiments. In some embodiments, for example, circuits 402 through 410 (or a subset thereof) may signal detection of diagnostics events to a CPU (e.g., CPU 226), which may then signal the diagnostics events to DDC 222. In other embodiments, diagnostics events signaling may be carried out over a serial or a parallel bus.

Figure 5:
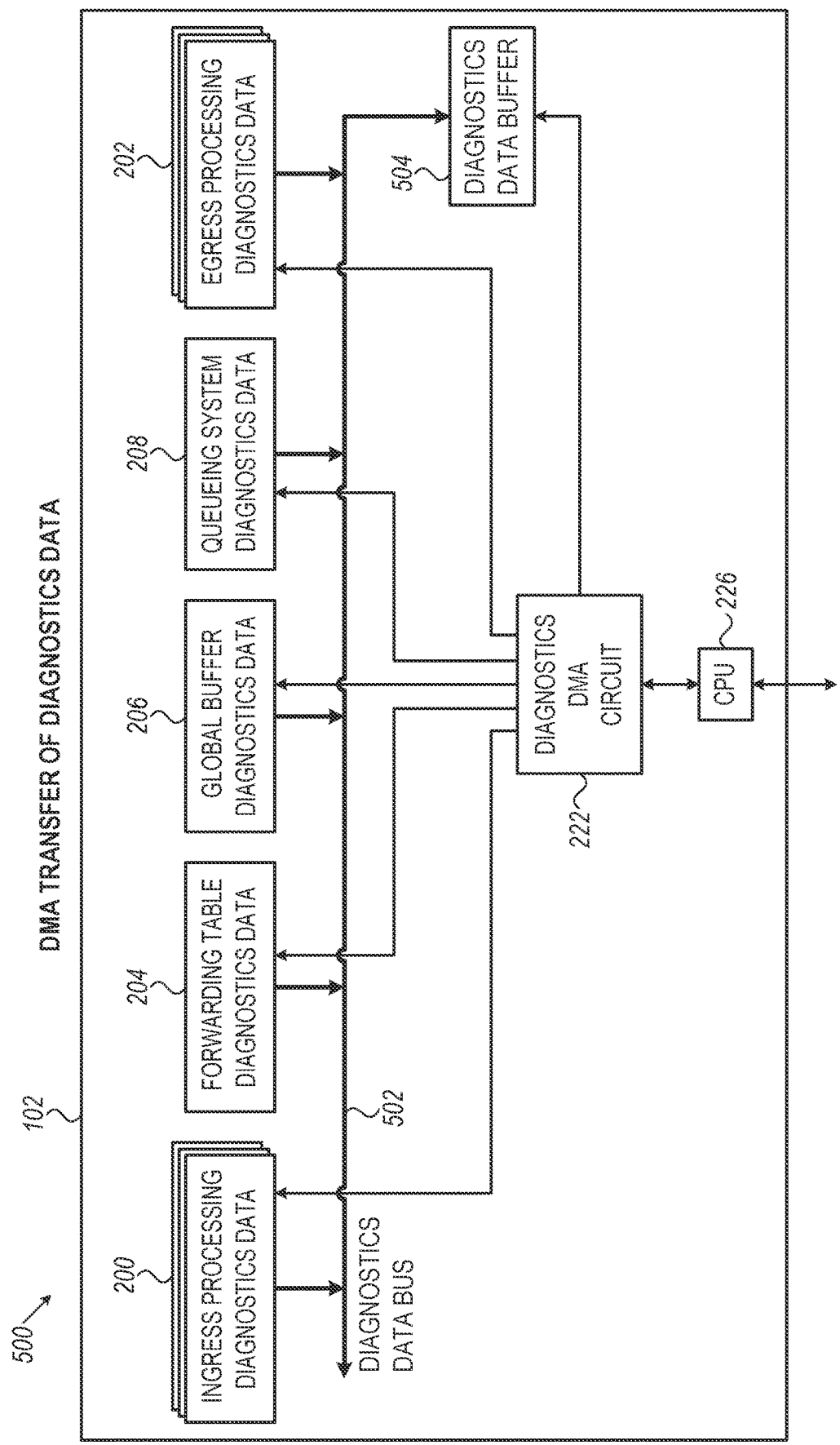
FIG. 5 is a block diagram that schematically illustrates a Direct Memory Access (DMA) scheme for transferring diagnostics data in an NCD, in accordance with an embodiment of the present invention.

FIG. 5 is a block diagram 500 that schematically illustrates a DMA scheme for transferring diagnostics data in an NCD 102, in accordance with an embodiment of the present invention. Each of Ingress-Ports-and-Processing circuits 200, Shared-Global-Buffer 204, Forwarding-Table 206, Queueing-System 208 and Egress-Ports-and-Processing circuits 202 (FIG. 2), (which will be collectively referred to as diagnostics-data sources), is configured to send the corresponding diagnostics data, through a diagnostics data bus 502, to a Diagnostics-Buffer 504. DDC 222 controls the DMA transfers, granting the diagnostics bus to one of the diagnostics data sources, and setting start and end addresses for the data to be transferred.

In some embodiments, when the predefined destination of the diagnostics data is CPU 226 or an address range in a memory of CPU 226 (not shown), the DDC DMA-transfers the diagnostics data to CPU 226 or to the CPU memory. In other embodiments, when the predefined destination of the diagnostics data is the host CPU that hosts the NCD, or an address range in the memory of the host CPU, the DDC DMA transfers the diagnostics data over a system bus (not shown) to the host and/or the host memory.

As would be appreciated, DMA scheme 500 illustrated in FIG. 5 and described hereinabove is an example embodiment cited by way of example. Other DMA schemes may be used in alternative embodiments. For example, in some embodiments, diagnostics data buffer 504 is distributed, and coupled to the diagnostics data sources via a plurality of busses. In embodiments, Diagnostics-Data-Buffer 504 is embedded in Shared-Global-Buffer 204 (FIG. 2).

Figure 6:
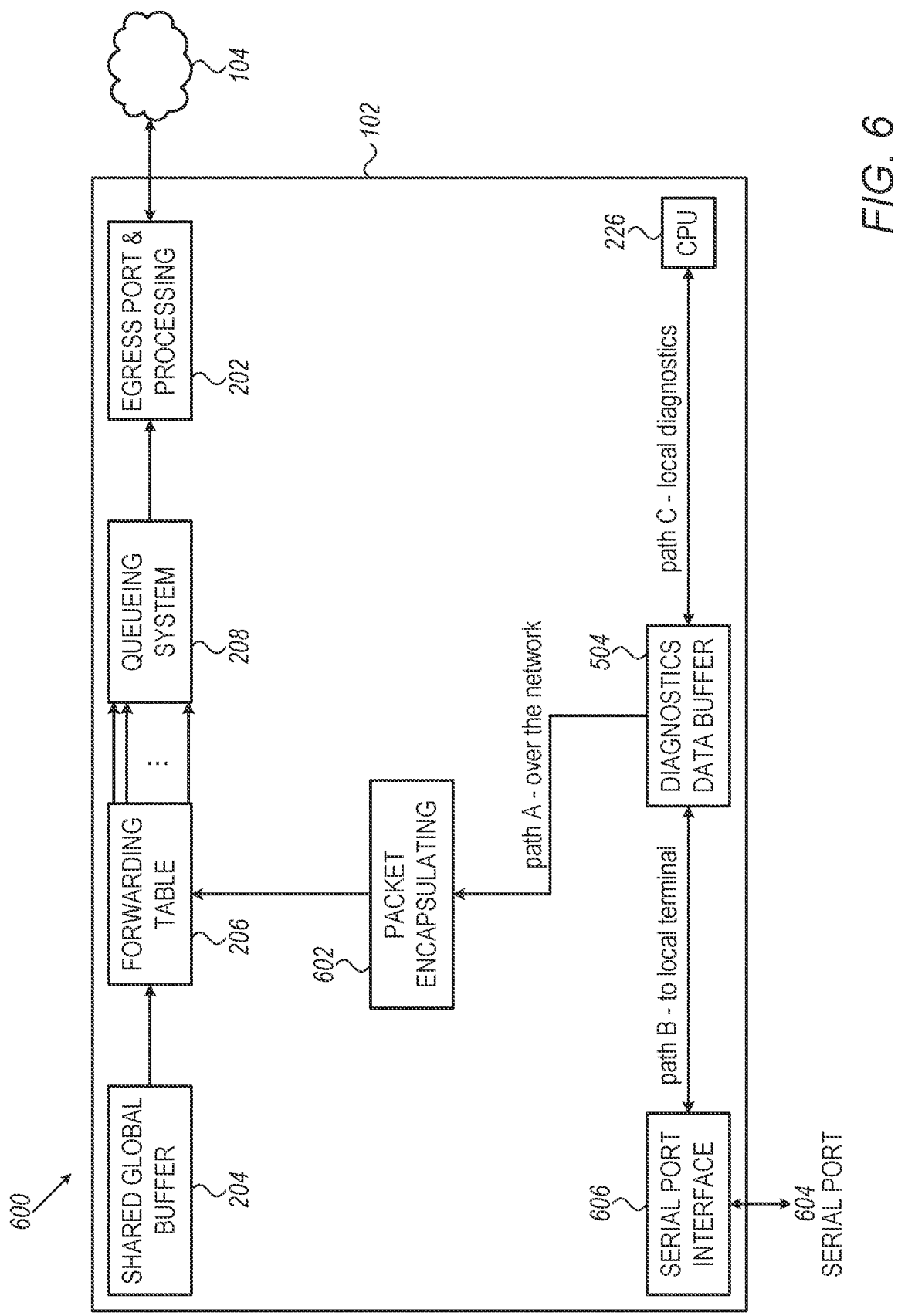
FIG. 6 is a block diagram that schematically illustrates the diagnostics data output circuitry that outputs diagnostics data from the NCD, according to an embodiment of the present invention.

FIG. 6 is a block diagram 600 that schematically illustrates the diagnostics data output circuitry that outputs diagnostics data from the NCD, according to an embodiment of the present invention. The diagnostics data is stored in Diagnostics-Data-Buffer 504 (FIG. 5), following step 308 (FIG. 3), in which the DDB DMA-transfers diagnostics data associated with one or more detected diagnostics events.

The example embodiment illustrated in FIG. 6 describes three paths in which diagnostics data can be output from NCD 102, designated path A, path B and path C.

Path A may be used to send the diagnostics data over the network, e.g. to remote diagnostics station 110 (FIG. 1). In some embodiments, the predefined destination for the diagnostics data the DDC receives comprises the address of a peer NCD (e.g., a CPU within the NCD or the host that hosts the NCD); The diagnostics data from diagnostics data buffer 504 is input to a Packet-Encapsulator 602, which adds headers and footers to the diagnostics data, and sends the packet to Forwarding Table 206. Forwarding Table 206 receives the packetized diagnostics data, (as well as non-diagnostics packets that the forwarding table receives from Shared Global Memory 204), and sends the diagnostics packets, through queueing system 208 and one of Egress-port-and-processing 202, to network 104.

Type B routing may be used when the diagnostics station is local, coupled to NCD 102 by a local serial port 604 (e.g., universal-serial-bus (USB)). Data is routed from diagnostics data buffer 504 to a serial-bus interface 606, which outputs the diagnostics data to a diagnostics station coupled to the serial port. Communication, in this case, is bidirectional—the diagnostics station may pull diagnostics data from the diagnostics data buffer.

Type C routing may be used when the diagnostics is carried out by the NCD; for example, by a diagnostics software that runs om CPU 226 (or on any other processor that is embedded in NCD 102). CPU 226 can read the diagnostics data buffer or parts thereof, and diagnose the data associated with the predefined diagnostics events.

As would be appreciated, the diagnostics data output circuit illustrated in FIG. 6 and described hereinabove is an example embodiment cited by way of example. Other circuits may be used in alternative embodiments. For example, in some embodiments, Diagnostics Data Buffer 504 is embedded in Shared Global Buffer 204. In an embodiment, packet encapsulation is done when the diagnostics data is stored in the diagnostics data buffer. In yet other embodiments, diagnostics data buffer 504 is coupled to a system bus (e.g., peripheral component interconnect Express (PCIe)), and the diagnostics data is read from the diagnostics data buffer by a processor that is coupled to the system bus.

The configuration of NCD 102 including DDC 222 and the methods of flowchart 300, illustrated in FIGS. 1 through 6, are example configurations and flowcharts that are depicted purely for the sake of conceptual clarity. Any other suitable configurations and flowcharts can be used in alternative embodiments. The NDC and the DDC may be implemented using suitable hardware, such as in one or more Application-Specific Integrated Circuit (ASIC) or Field-Programmable Gate Arrays (FPGA), using software, using hardware, or using a combination of hardware and software elements.

In some embodiments, some or all of the functions carried out by DDC 222 may be carried out by CPU 226. In an embodiment, DDC 222 may be implemented using one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network-connected device, comprising:
   at least one communication port, configured to communicate packets over a network;
   packet processing circuitry, which is configured to receive, buffer, process and transmit the packets, the packet processing circuitry including a plurality of sub-units which generate diagnostics data;
   a diagnostics data buffer;
   aggregation circuitry connecting the plurality of sub-units to the diagnostics data buffer; and
   Diagnostics Direct Memory Access (DMA) Circuitry (DDC) configured to:
      receive a definition of (i) one or more diagnostic events, and (ii) for each diagnostic event, a corresponding list of diagnostic data that is generated in the packet processing circuitry and that pertains to the diagnostic event; and
      responsively to occurrence of a diagnostic event, gather diagnostic data of the list corresponding to the diagnostic event from the sub-units of the packet processing circuitry, through the aggregation circuitry, in the diagnostics data buffer.

2. The network-connected device according to claim 1, wherein the DDC is configured, responsively to occurrence of multiple diagnostic events, to gather diagnostic data in multiple respective lists of diagnostic data from the packet processing circuitry over respective time periods that at least partially overlap one another.

3. The network-connected device according to claim 1, wherein the DDC comprises multiple DDC instances that are configured to gather the diagnostic data in the lists.

4. The network-connected device according to claim 3, wherein at least two of the DDC instances are configured to gather the diagnostic data from respective different parts of the packet processing circuitry.

5. The network-connected device according to claim 3, wherein at least two of the DDC instances are configured to gather the diagnostic data pertaining to a same diagnostic event.

6. The network-connected device according to claim 1, wherein the packet processing circuitry comprises a packet processing pipeline having multiple pipeline stages, and wherein the DDC is configured to gather the diagnostic data from two or more of the pipeline stages.

7. The network-connected device according to claim 1, wherein the DDC is configured to gather the diagnostic data by reading one or more counter values in the packet processing circuitry.

8. The network-connected device according to claim 1, wherein the DDC is configured to receive a diagnostics trigger, to gather the corresponding list of diagnostic data from the packet processing circuitry, and to send the gathered diagnostic data to a specified destination responsively to the diagnostics trigger.

9. The network-connected device according to claim 1, wherein the DDC is configured to send the gathered diagnostic data to a specified destination.

10. The network-connected device according to claim 9, further comprising a memory, wherein the specified destination comprises storage locations in the memory.

11. The network-connected device according to claim 9, wherein the specified destination comprises a processor of the network-connected device, or a host that hosts the network-connected device.

12. The network-connected device according to claim 9, wherein the specified destination comprises an address of another network-connected device that is coupled to the network.

13. The network-connected device according to claim 9, wherein the packet processing circuitry comprises an egress queue for queuing egress packets, and wherein the DDC is configured to send the gathered diagnostic data to the egress queue.

14. The network-connected device according to claim 1, wherein the DDC is configured to consult the definition for the corresponding list of the diagnostic event that occurred, responsively to occurrence of a diagnostic event, and to gather the diagnostic data of the corresponding list determined from consulting the definition.

15. The network-connected device according to claim 1, wherein the sub-units comprise ingress-port processing circuits, egress-port processing circuits, buffers, and forwarding tables.

16. The network-connected device according to claim 1, wherein the aggregation circuitry comprises a bus connecting the plurality of sub-units to the diagnostics data buffer.

17. The network-connected device according to claim 1, wherein the aggregation circuitry comprises a diagnostics data bus, separate from a system bus, connecting the plurality of sub-units to the diagnostics data buffer.

18. A method, comprising:
   in a network-connected device, receiving, buffering, processing and transmitting packets over a network using packet processing circuitry; and
   using Diagnostics Direct Memory Access (DMA) Circuitry (DDC) in the network-connected device:
      receiving a definition of (i) one or more diagnostic events, and (ii) for each diagnostic event, a corresponding list of diagnostic data that is generated in the packet processing circuitry and that pertains to the diagnostic event; and
      responsively to occurrence of a diagnostic event, gathering, in a diagnostics data buffer, diagnostic data of the list corresponding to the diagnostic event from a plurality of sub-units of the packet processing circuitry, through aggregation circuitry connecting the plurality of sub-units to the diagnostics data buffer.

19. The method according to claim 18, wherein gathering the diagnostic data comprises, responsively to occurrence of multiple diagnostic events, gathering diagnostic data in multiple respective lists of diagnostic data from the packet processing circuitry over respective time periods that at least partially overlap one another.

20. The method according to claim 18, wherein gathering the diagnostic data comprises gathering the diagnostic data, in the lists, by multiple DDC instances.

21. The method according to claim 20, wherein gathering the diagnostic data comprises gathering the diagnostic data from at least two different parts of the packet processing circuitry by at least two respective ones of the DDC instances.

22. The method according to claim 20, wherein gathering the diagnostic data comprises gathering the diagnostic data pertaining to a same diagnostic event by at least two of the DDC instances.

23. The method according to claim 18, wherein the packet processing circuitry comprises a packet processing pipeline having multiple pipeline stages, and wherein gathering the diagnostic data comprises gathering the diagnostic data from two or more of the pipeline stages.

24. The method according to claim 18, wherein gathering the diagnostic data comprises gathering the diagnostic data by reading one or more counter values in the packet processing circuitry.

25. The method according to claim 18, wherein gathering the diagnostic data comprises receiving a diagnostics trigger, and gathering the diagnostic data of the corresponding list from the packet processing circuitry responsively to the diagnostics trigger.

26. The method according to claim 18, further comprising sending the gathered diagnostic data to a specified destination.

27. The method according to claim 26, wherein sending the diagnostic data comprises sending the diagnostic data to storage locations in a memory.

28. The method according to claim 26, wherein sending the gathered diagnostic data comprises sending the gathered diagnostic data to a processor of the network-connected device, or to a host that hosts the network-connected device.

29. The method according to claim 26, wherein sending the gathered diagnostic data comprises sending the gathered diagnostic data to an address of another network-connected device that is coupled to the network.

30. The method according to claim 26, wherein the packet processing circuitry comprises an egress queue for queuing egress packets, and wherein sending the gathered diagnostic data comprises sending the gathered diagnostic data to the egress queue.

31. A method, comprising:
in a network device, receiving, processing and transmitting packets over a network using packet-processing circuitry; and
operating, in the network device, diagnostic circuitry that:
receives a definition of (i) diagnostic events that are expected to occur in the network device, and (ii) for each diagnostic event, a corresponding list of diagnostic data that is to be collected for analysis from the packet-processing circuitry; and
upon occurrence of a diagnostic event, gathers, in a diagnostics data buffer, the list of diagnostic data which corresponds to the diagnostic event according to the definition, from a plurality of sub-units of the packet processing circuitry, through aggregation circuitry connecting the plurality of sub-units to the diagnostics data buffer.

\* \* \* \* \*